US008371700B2

(12) United States Patent
Lin et al.

(10) Patent No.: US 8,371,700 B2
(45) Date of Patent: Feb. 12, 2013

(54) HEAT DISSIPATION MODULE AND PROJECTION APPARATUS USING THE SAME

(75) Inventors: Tai-Wei Lin, Hsin-Chu (TW); Jia-Bin Huang, Hsin-Chu (TW); Chi-Chui Yun, Hsin-Chu (TW)

(73) Assignee: Young Optics Inc. (TW)

( * ) Notice: Subject to any disclaimer, the term of this patent is extended or adjusted under 35 U.S.C. 154(b) by 330 days.

(21) Appl. No.: 12/662,273

(22) Filed: Apr. 8, 2010

(65) Prior Publication Data
US 2010/0265468 A1 Oct. 21, 2010

(30) Foreign Application Priority Data

Apr. 21, 2009 (TW) .................... 98113200 A

(51) Int. Cl.
*G03B 21/18* (2006.01)
(52) U.S. Cl. ..................... 353/61; 165/104.26
(58) Field of Classification Search ............. 353/61, 353/54, 60; 165/104.26
See application file for complete search history.

(56) References Cited

U.S. PATENT DOCUMENTS

| 7,000,687 | B2 | 2/2006 | Ying et al. |
| 7,143,819 | B2 | 12/2006 | Malone et al. |
| 7,524,084 | B2 * | 4/2009 | Ikeda et al. ............. 362/231 |
| 2009/0173474 | A1 * | 7/2009 | Chang ................. 165/104.26 |

FOREIGN PATENT DOCUMENTS

| CN | 100343985 C | 10/2007 |
| TW | 539398 | 6/2003 |
| TW | 249426 | * 11/2004 |
| TW | 260772 | * 4/2005 |
| TW | 261976 | * 4/2005 |
| TW | 261984 | * 4/2005 |
| TW | 1235906 | * 7/2005 |
| TW | I240140 B | 9/2005 |
| TW | 1243638 | * 11/2005 |
| TW | 200810673 | * 2/2008 |
| TW | 334959 | 6/2008 |

OTHER PUBLICATIONS

BWIGN, Cooler Master V8, Sep. 1, 2008, http:/www.coolermaster.com/product.php?product_id=5279.*
Unknown Author, Taiwan Office Action, dated Oct. 16, 2012, for Taiwan Application No. 098113200, filed Apr. 21, 2009, 10 pages (including the English translation), published by the TWIPO.

* cited by examiner

*Primary Examiner* — Francis M Legasse, Jr.
*Assistant Examiner* — Jerry Brooks
(74) *Attorney, Agent, or Firm* — MH2 Technology Law Group, LLP

(57) ABSTRACT

A heat dissipation module includes a heat-absorbing unit, a first heat pipe, a second heat pipe, and a heat-dissipating unit. The heat-absorbing unit is adapted to contact the heat source thermally. The first heat pipe has a first heat-absorbing section being connected to the heat-absorbing unit and a first heat-dissipating section. The second heat pipe has a second heat-absorbing section being connected to the heat-absorbing unit and a second heat-dissipating section. The heat-dissipating unit includes a first fin assembly and a second fin assembly. The first heat-dissipating section is connected to the first fin assembly along a first extending direction, the second heat-dissipating section is connected to the second fin assembly along a second extending direction, the first extending direction and second extending direction are oblique to each other, and a part of the first fin assembly and a part of the second fin assembly are inset to each other.

9 Claims, 5 Drawing Sheets

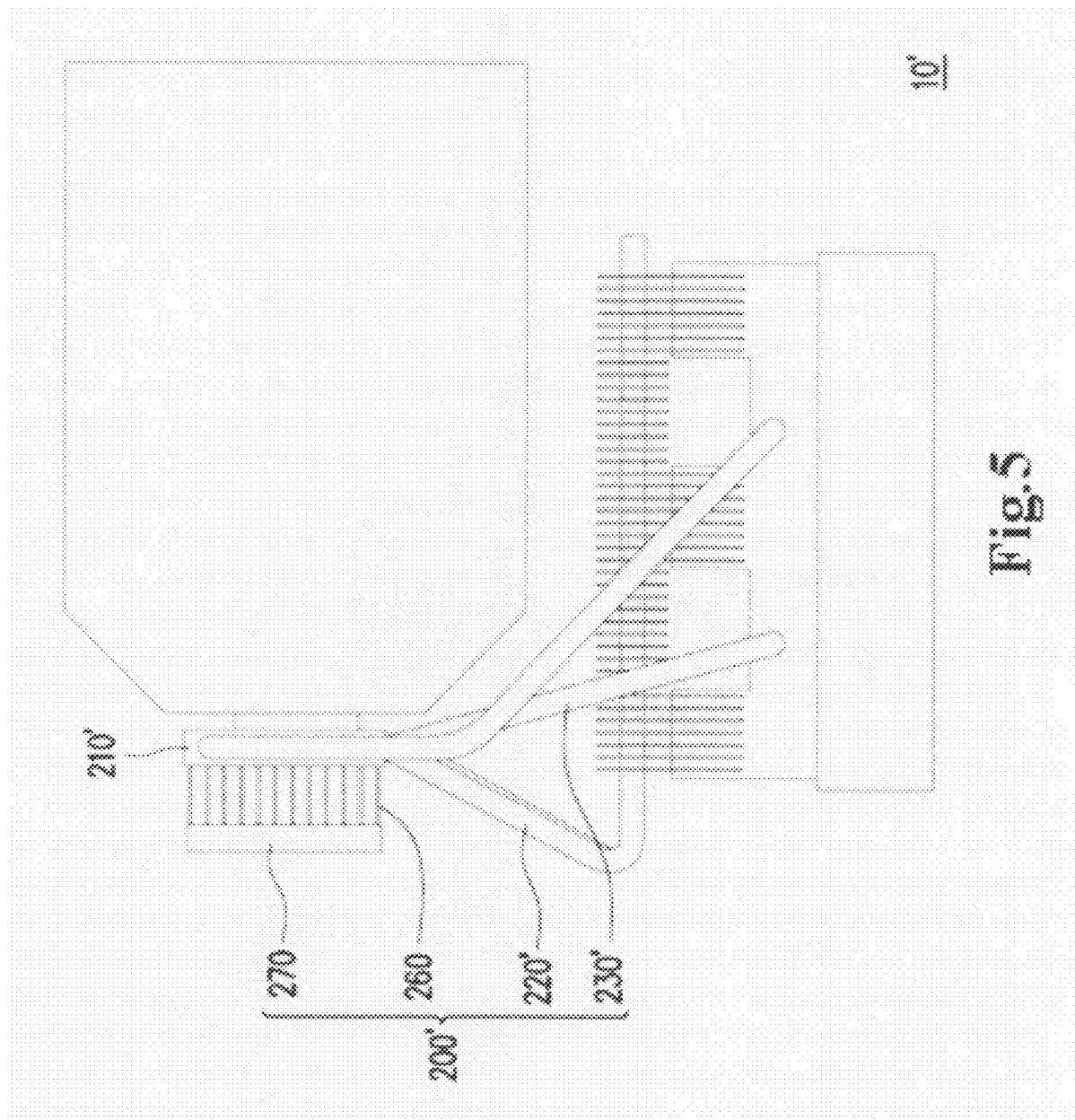

HEAT DISSIPATION MODULE AND PROJECTION APPARATUS USING THE SAME

CROSS-REFERENCE TO RELATED APPLICATION

This application claims the priority benefit of Taiwan application serial no. 098113200, filed on Apr. 21, 2009. The entirety of the above-mentioned patent application is hereby incorporated by reference herein and made a part of this specification.

BACKGROUND OF THE INVENTION

1. Field of the Invention

The invention relates to a heat dissipation module, and more particularly, to a heat dissipation module using in a projection apparatus.

2. Description of Related Art

Generally speaking, to ensure that the electronic products keep in a normal working temperature range, heat dissipation fins may be disposed on the heat-generating devices of the electronic products and coordinate with the cool air provided by the fans to quickly remove the heat generated by the operation of the heat-generating devices.

In recent years, a kind of heat pipe for removing the heat generated by the operation of the heat-generating devices by the change of liquid state and gaseous state is receiving more attention as a result of the large heat transfer quantity and the long heat transfer distance of the heat pipe. The patents related the heat pipes are, for example, U.S. Pat. No. 7,143,819 and Taiwan patent No. 334959 and 261976.

The working principle of the heat pipe is that the heat is transferred through evaporating and condensing the working fluid. First, the liquid working fluid evaporates into gas by absorbing the heat generated by the heat-generating devices of the evaporator of the adjacent heat pipe. When getting a little pressure difference, the gaseous working fluid may flow to the condenser of the heat pipe, condense into liquid at the condenser and dissipate heat. The liquid working fluid condensing at the condenser may reflow to the evaporator through a capillary structure on the inner surface of the heat pipe.

When the heat pipe is placed vertically to make the condenser be relatively downward and make the evaporator be relatively upward, the working fluid in the heat pipe may be not easy to flow from the lower condenser to the upper evaporator, so that the heat transfer efficiency of the heat pipe is affected.

SUMMARY OF THE INVENTION

The invention provides a heat dissipation module capable of having good heat dissipation efficiency regardless of the placement angle.

The invention provides a projection apparatus and the heat dissipation module of the projection apparatus capable of having good heat dissipation efficiency regardless of the placement angle.

Other objectives and advantages of the invention may be further understood by the technical features disclosed in the invention.

To achieve at least one of or other objectives, one embodiment of the invention provides a heat dissipation module, and the heat dissipation module is adapted to dissipate heat generated by a heat source. The heat dissipation module includes a heat-absorbing unit, a first heat pipe, a second heat pipe, and a heat-dissipating unit. The heat-absorbing unit is adapted, to contact the heat source thermally. The first heat pipe has a first heat-absorbing section and a first heat-dissipating section, and the first heat-absorbing is connected to the heat-absorbing unit. The second heat pipe has a second heat-absorbing section and a second heat-dissipating section, and the second heat-absorbing section is connected to the heat-absorbing unit. The heat-dissipating unit includes a first fin assembly and a second fin assembly, the first heat-dissipating section is connected to the first fin assembly along a first extending direction. The second heat-dissipating section is connected to the second fin assembly along a second extending direction, and the first extending direction and the second extending direction are oblique to each other, wherein a part of the first fin assembly and a part of the second fin assembly are inset to each other.

One embodiment of the invention provides a projection apparatus, including an optical engine and a heat dissipation module. The optical engine has a light source capable of providing an illumination beam. The heat dissipation module includes a heat-absorbing unit, a first heat pipe, a second heat pipe, and a heat-dissipating unit. The heat-absorbing unit contacts the light source thermally. The first heat pipe has a first heat-absorbing section and a first heat-dissipating section, and the first heat-absorbing is connected to the heat-absorbing unit. The second heat pipe has a second heat-absorbing section and a second heat-dissipating section, and the second heat-absorbing section is connected to the heat-absorbing unit. The heat-dissipating unit includes a first fin assembly and a second fin assembly, the first heat-dissipating section is connected to the first fin assembly along a first extending direction. The second heat-dissipating section is connected to the second fin assembly along a second extending direction, and the first extending direction and the second extending direction are oblique to each other, wherein a part of the first fin assembly and a part of the second fin assembly are inset to each other.

In one embodiment of the invention, the optical engine of the above-mentioned projection apparatus further includes a light valve, wherein the light source is capable of providing the illumination beam to the light valve, and the light valve is capable of converting the illumination beam into an image beam.

In one embodiment of the invention, an included angle is between a projection of the above-mentioned first extending direction on a plane of the second extending direction and the second extending direction, and the included angle is substantially 90 degrees.

In one embodiment of the invention, the above-mentioned heat dissipation module further includes a first fan disposed on the heat-dissipating unit.

In one embodiment of the invention, the above-mentioned heat dissipation module further includes a third fin assembly and a second fan. The third fin assembly is disposed on the heat-dissipating unit, and the second fan is disposed on the third fin assembly.

In summary, the embodiment or embodiments of the invention may have at least one of the following advantages: the first heat-dissipating section and the second heat-dissipating section are respectively connected to the first fin assembly and the second fan assembly of the heat-dissipating unit along the extending directions oblique to each other. Therefore, when the heat dissipation efficiency of one of the first heat-dissipating section and the second heat-dissipating section reduces as a result of the gravity function, the other one of the first heat-dissipating section and the second heat-dissipating section may still maintain good heat dissipation efficiency. Therefore, no matter what placement angle the projection apparatus has to coordinate with the usage, the heat-dissipation apparatus of the projection apparatus may provide good heat dissipation efficiency for the optical engine.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 5 is a top view of a projection apparatus according to one embodiment of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
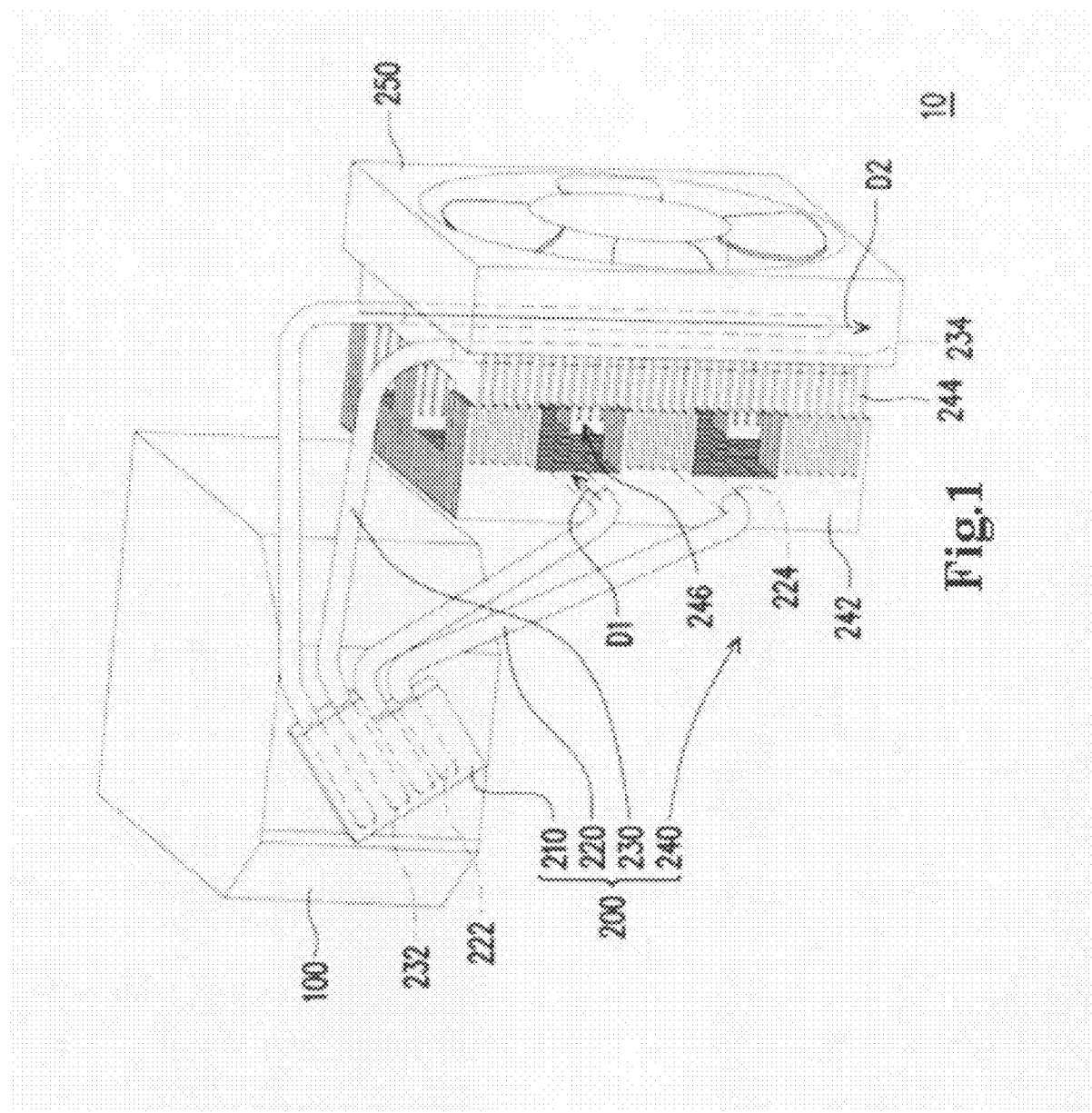
FIG. 1 is a schematic diagram of a projection apparatus according to one embodiment of the invention.
Figure 2:
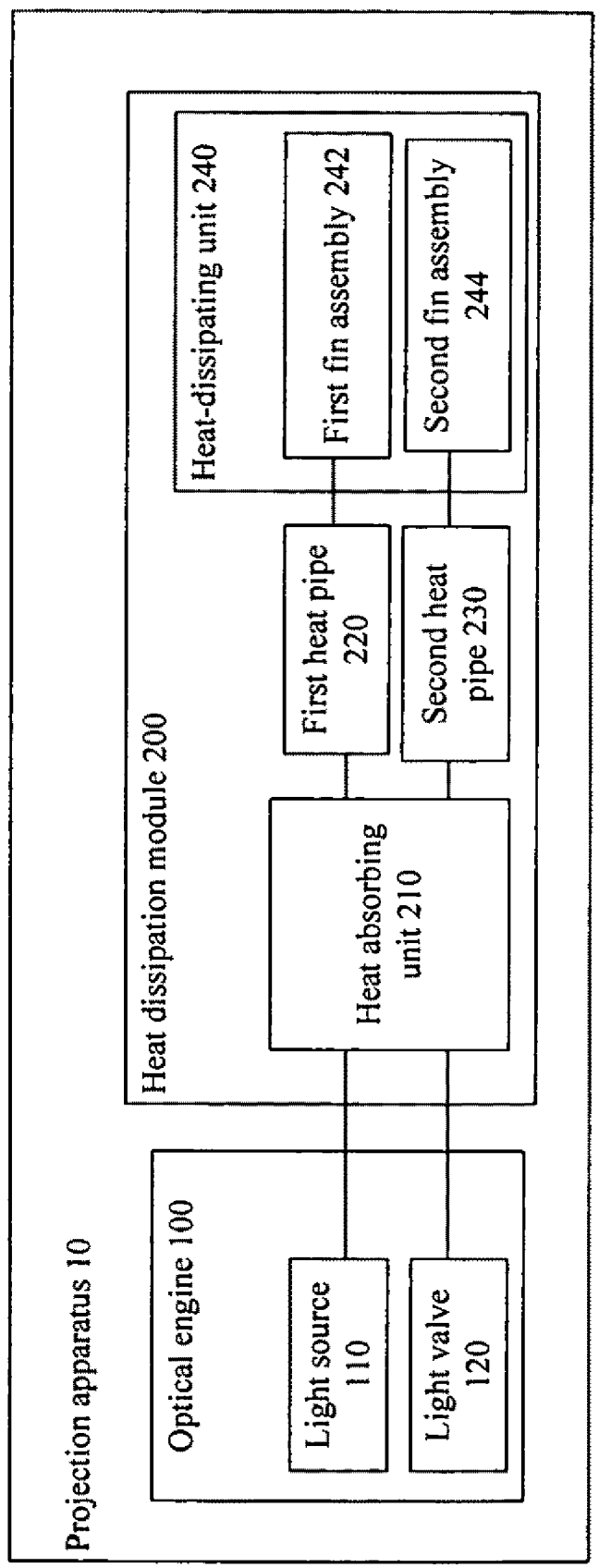
FIG. 2 is a block diagram of a projection apparatus in FIG. 1.
Figure 3:
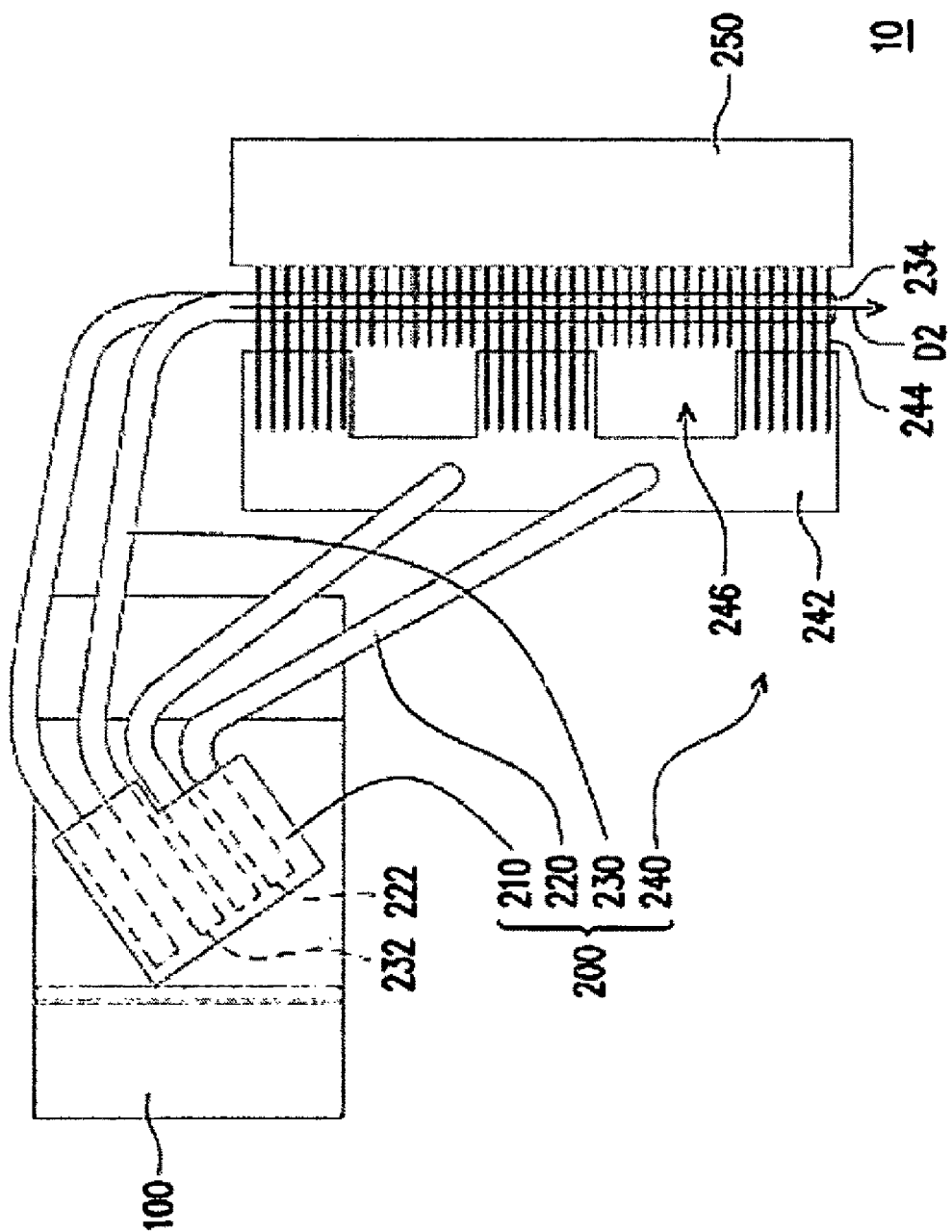
FIG. 3 is a front view of the projection apparatus in FIG. 1.
Figure 4:
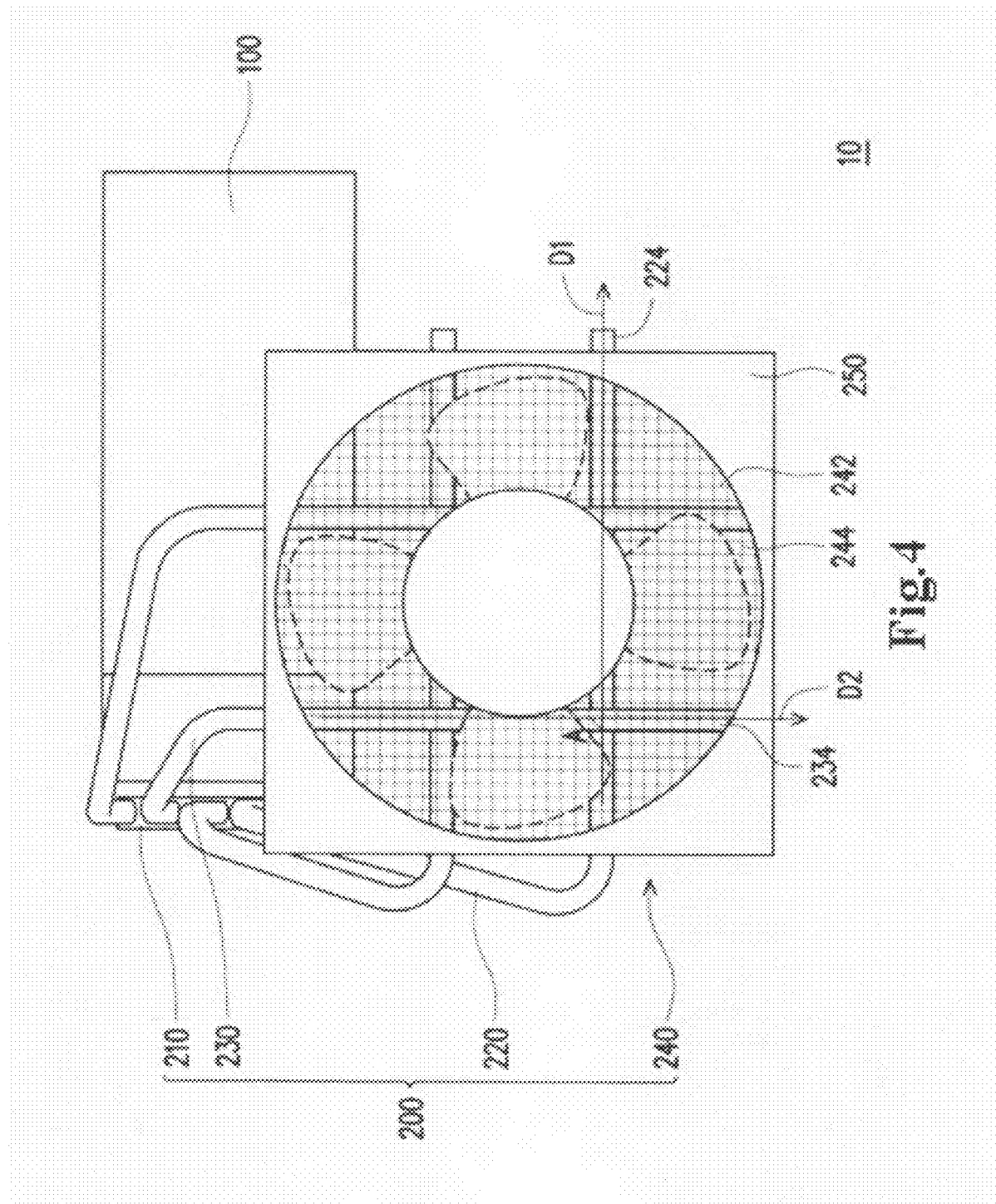
FIG. 4 is a side view of the projection apparatus in FIG. 1.

Referring to FIGS. 1 and 2, a projection apparatus 10 includes an optical engine 100 and a heat dissipation module 200. In the embodiment, the optical engine 100 has a light source 110 and a light valve 120, wherein the light source 110 includes a plurality of light emitting diodes (LEDs), for example. The light source 110 is capable of providing an illuminating beam. The light valve 120 is disposed in the transmission path of the illumination beam and is capable of converting the illumination beam into an image beam.

Referring to FIGS. 1 to 4, the heat dissipation module 200 includes a heat-absorbing unit 210, two first heat pipes 220, two second heat pipes 230, and a heat-dissipating unit 240, wherein the heat-absorbing unit 210 contacts the light source 110 and the light valve 120 thermally to absorb the heat generated by the light source 110 and the light valve 120. Moreover, in order to make the figures be clear and easy to understand, the blades of the heat-dissipating unit 240 are showed by using dotted lines.

The first heat pipe 220 has a first heat-absorbing section 222 and a first heat-dissipating section 224, and the first heat-absorbing section 222 is connected to the heat-absorbing unit 210. The second heat pipe 230 has a second heat-absorbing section 232 and a second heat-dissipating section 234, and the second heat-absorbing section 232 is connected to heat-absorbing unit 210.

In more detail, since the first heat-absorbing section 222 of the first heat pipe 220 is connected to the heat-absorbing unit 210, the heat generated by the light source 110 and the light valve 120 may be transferred to the first heat-absorbing section 222 through the heat-absorbing unit 210 to make the working fluid (not described) in the first heat-absorbing section 222 vaporized from liquid to gas. Then, the gas state working fluid flows from the first heat-absorbing section 222 to the first heat-dissipating section 224 with temperature lower than temperature of the first heat-absorbing section 222 and condenses into liquid state working fluid in the first heat-dissipating section 224.

Therefore, the gas state working fluid in the first heat-absorbing section 222 may slowly increase, and the gas state working fluid in the first heat-dissipating section 224 may slowly reduce. In this way, the gas state working fluid may continuously flow from the first heat-absorbing section 222 to the first heat-dissipating section 224 by the air pressure difference.

Furthermore, the liquid state working fluid in the first heat-absorbing section 222 may vaporize into gas state working fluid and reduce slowly, then because of the capillary action, the liquid state working fluid in the heat-dissipating section 224 is transferred to the first heat-absorbing section 222 through the capillary structure in the first heat pipe 220. Until now, the working fluid completes one circulation.

By the continuous circulation of the working fluid, the heat generated by the light source 110 and the light valve 120 may continuously be transferred to the first heat-dissipating section 224, and then dissipate outside. Therefore, the working fluid flows mainly by the pressure difference and the capillary action between the first heat-absorbing section 222 and the first heat-dissipating section 224. In addition, the operating method of the second heat pipe 230 is similar to the operating method of the first heat pipe 220, and is not discussed here.

The first heat-dissipating section 224 is connected to the heat-dissipating unit 240 along a first extending direction D1, and the second heat-dissipating section 234 is connected to the heat-dissipating unit 240 along a second extending direction. The first extending direction D1 and the second extending direction D2 are oblique to each other. In other word, the first heat-dissipating section 224 and the second heat-dissipating 234 may not be perpendicular to the ground at the same time. Therefore, at least one of the first heat-dissipating section 224 and the second heat-dissipating 234 has a component perpendicular the gravity direction. In the embodiment, the second extending direction D2 is, for example, parallel to the gravity direction, and the first extending direction D1 is perpendicular to the gravity direction. In other word, an included angle A is between a projection of the first extending direction D1 on a plane of the second extending direction D2 and the second extending direction D2, and the included angle A is substantially 90 degrees. In this way, the working fluid in the first heat-dissipating section 224 is not easy to gather in the first heat-dissipating section 224 by the function of the gravity. In other word, the first heat-dissipating section 224 suffers little gravity impact, so the first heat pipe 220 may operate normally and effectively.

Therefore, no matter what placement angle the projection apparatus 10 has to coordinate with the usage, the heat-dissipation module 200 may provide good heat dissipation efficiency for the optical engine 100, so that the optical engine 100 maintains in a normal working temperature range.

In addition, in the embodiment, the heat-dissipating unit 240 includes a first fin assembly 242 and a second fin assembly 244, the first heat-dissipating section 224 is connected to the first fin assembly 242, and the second heat-dissipating section 234 is connected to the second fin assembly 244. In more detail, a part of the first fin assembly 242 and a part of the second fin assembly 244 are inset to each other and tightly fixed to each other. Therefore, the heat carried by the first fin assembly 242 and the heat carried by the second fin assembly 244 may be transferred to each other to increase heat dissipation area.

Only a part of the first fin assembly 242 and a part of the second fin assembly 244 are inset to each other, so a channel 246 may be disposed between the first fin assembly 242 and the second fin assembly 244. Through the channel 246, the wind resistance flowing through the first fin assembly 242 and the second fin assembly 244 is reduced effectively to improve the heat dissipation efficiency of the heat-dissipating unit 240.

Furthermore, the heat dissipation module 200 may further include a first fan 250. The fan 250 is disposed towards the first fin assembly 242 or the second fin assembly 244, and the airflow provided by the fan 250 blows to the first fin assembly 242 or the second fin assembly 244. Therefore, the heat transferred to the first fin assembly 242 and the second fin assembly 244 through the first heat-dissipating section 224 and the second heat-dissipation 234 may be dissipated into air quickly by the airflow provided by the first fan 250.

Referring to FIG. 5, the difference between the projection apparatus 10' in the embodiment and the projection apparatus 10 in the above-mentioned embodiment is described as below: the heat dissipation module 200' further includes a third fin assembly 260 and a second fan 270. The third fin assembly 260 is disposed at the heat-absorbing unit 210', the second fan 270 is disposed towards the third fin assembly 260, and the airflow provided by the second fan 270 may flow to the third fin assembly 260. Therefore, the heat generated by the heat-absorbing unit 210' may not only be transferred to first fin assembly 242 and the second fin assembly 244 through the first heat pipe 220' and the second heat pipe 230', and then be dissipated into air, but also be directly transferred to the third fin assembly 260, and be dissipated into air quickly by the airflow produced by the second fan 270. In other word, comparing with the projection apparatus 10, the projection apparatus 10' may have higher heat dissipation efficiency.

In summary, the embodiment or embodiments of the invention may have at least one of the following advantages: the first heat-dissipating section and the second heat-dissipating section are respectively connected to first fin assembly and the second fin assembly along the extending directions oblique to each other. Therefore, when the heat dissipation efficiency of one of the first heat-dissipating section and the second heat-dissipating section reduces as a result of the gravity function, the other one of the first heat-dissipating section and the second heat-dissipating section may still maintain good heat dissipation efficiency. Therefore, no matter what placement angle the projection apparatus has to coordinate with the usage, the heat-dissipation apparatus of the projection apparatus may provide good heat dissipation efficiency for the optical engine. In addition, a part of the first fin assembly and a part of the second fin assembly are inset to each other and tightly fixed to each other to increase heat dissipation area. Moreover, a channel may be disposed between the first fin assembly and the second fin assembly to effectively reduce the wind resistance flowing through the first fin assembly and the second fin assembly, so that the heat dissipation efficiency of the heat-dissipating unit is improved. Furthermore, a third fin assembly and a second fan may be disposed outside of the heat-absorbing unit in the heat dissipation module to improve the heat dissipation efficiency.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A heat dissipation module, adapted to dissipate heat generated by a heat source, the heat dissipation module comprising:
- a heat-absorbing unit, adapted to contact the heat source thermally;
- a first heat pipe, having a first heat-absorbing section and a first heat-dissipating section, and the first heat-absorbing section being connected to the heat-absorbing unit;
- a second heat pipe, having a second heat-absorbing section and a second heat-dissipating section, and the second heat-absorbing section being connected to the heat-absorbing unit; and
- a heat-dissipating unit, comprising a plurality of sides including a first side and a second side being different from the first side, a first fin assembly comprising a plurality of fins being parallel to each other and a second fin assembly comprising a plurality of fins being parallel to each other, the first heat-dissipating section being connected to the first fin assembly at the first side of the heat-dissipating unit along a first extending direction, the second heat-dissipating section being connected to the second fin assembly at the second side of the heat-dissipating unit along a second extending direction, the first extending direction and the second extending direction being skew to each other, wherein a part of the fins of the first fin assembly are inset to a part of the fins of the second fin assembly.

2. The heat dissipation module as claimed in claim 1, wherein an included angle is between a projection of the first extending direction on a plane of the second extending direction and the second extending direction, and the included angle is substantially 90 degrees.

3. The heat dissipation module as claimed in claim 1, further comprising a first fan disposed on the heat-dissipating unit.

4. The heat dissipation module as claimed in claim 1, further comprising a third fin assembly and a second fan, the third fin assembly disposed on the heat-absorbing unit, and the second fan disposed on the third fin assembly.

5. A projection apparatus, comprising:
- an optical engine, having a light source capable of providing an illumination beam; and
- a heat dissipation module, comprising:
  - a heat-absorbing unit, contacting the light source thermally;
  - a first heat pipe, having a first heat-absorbing section and a first heat-dissipating section, and the first heat-absorbing section being connected to the heat-absorbing unit;
  - a second heat pipe, having a second heat-absorbing section and a second heat-dissipating section, and the second heat-absorbing section being connected to the heat-absorbing unit; and
  - a heat-dissipating unit, comprising a plurality of sides including a first side and a second side being different from the first side, a first fin assembly comprising a plurality of fins being parallel to each other and a second fin assembly comprising a plurality of fins being parallel to each other, the first heat-dissipating section being connected to the first fin assembly at the first side of the heat-dissipating unit along a first extending direction, the second heat-dissipating section being connected to the second fin assembly at the second side of the heat-dissipating unit along a second extending direction, the first extending direction and the second extending direction being skew to each other, wherein a part of the fins of the first fin assembly are inset to a part of the fins of the second fin assembly.

6. The projection apparatus as claimed in claim 5, wherein the optical engine further comprises a light valve, the light source is capable of providing the illumination beam to the light valve, and the light valve is capable of converting the illumination beam into an image beam.

7. The projection apparatus as claimed in claim 5, wherein an included angle is between a projection of the first extending direction on a plane of the second extending direction and the second extending direction, and the included angle is substantially 90 degrees.

8. The projection apparatus as claimed in claim 5, wherein the heat dissipation module further comprises a first fan disposed on the heat-dissipating unit.

9. The projection apparatus as claimed in claim 5, wherein the heat dissipation module further comprises a third fin assembly and a second fan, the third fin assembly is disposed on the heat-absorbing unit, and the second fan is disposed on the third fin assembly.

* * * * *